(12) United States Patent
Wilson et al.

(10) Patent No.: US 11,320,560 B2
(45) Date of Patent: May 3, 2022

(54) DOWNHOLE RANGING USING SPATIALLY CONTINUOUS CONSTRAINTS

(71) Applicant: Halliburton Energy Services, Inc., Houston, TX (US)

(72) Inventors: Glenn Andrew Wilson, Houston, TX (US); Hsu-Hsiang Wu, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 196 days.

(21) Appl. No.: 15/775,569

(22) PCT Filed: Jun. 8, 2017

(86) PCT No.: PCT/US2017/036538
§ 371 (c)(1),
(2) Date: May 11, 2018

(87) PCT Pub. No.: WO2018/226233
PCT Pub. Date: Dec. 13, 2018

(65) Prior Publication Data
US 2021/0173114 A1     Jun. 10, 2021

(51) Int. Cl.
*G01V 3/34* (2006.01)
*E21B 47/0228* (2012.01)
*G01V 3/30* (2006.01)

(52) U.S. Cl.
CPC .......... *G01V 3/34* (2013.01); *E21B 47/0228* (2020.05); *G01V 3/30* (2013.01)

(58) Field of Classification Search
CPC ......... G01V 3/34; G01V 3/30; E21B 47/0228
See application file for complete search history.

(56) References Cited

U.S. PATENT DOCUMENTS

| | | | | |
|---|---|---|---|---|
| 5,065,099 A | * | 11/1991 | Sinclair | G01V 3/28 324/339 |
| 5,274,604 A | * | 12/1993 | D'Angelo | G01V 1/50 367/35 |

(Continued)

FOREIGN PATENT DOCUMENTS

| | | | | |
|---|---|---|---|---|
| WO | WO-2013025222 A2 | * | 2/2013 | ......... E21B 43/2406 |
| WO | WO 2013/071223 A2 | | 5/2013 | |

(Continued)

OTHER PUBLICATIONS

International Search Report and The Written Opinion of the International Search Authority, or the Declaration, dated Mar. 6, 2018, PCT/US2017/036538, 15 pages, ISA/KR.

(Continued)

*Primary Examiner* — Jay Patidar
*Assistant Examiner* — Sean Curtis
(74) *Attorney, Agent, or Firm* — Haynes and Boone, LLP (57) ABSTRACT

A ranging system using spatially continuous filtering techniques to constrain ranging measurements, thereby improving ranging calculations between a bottom-hole-assembly and at least one target well. By taking advantage of the spatial continuity of the wellbore geometry, a quality check of a ranging measurement is performed using ranging measurements acquired at prior depths. Thus, the methods described herein provide improved ranging and direction estimates, as well as prediction of ranging and direction of the target well ahead of the bottom-hole-assembly.

16 Claims, 4 Drawing Sheets

(56) References Cited

U.S. PATENT DOCUMENTS

| | | | | |
|---|---|---|---|---|
| 5,589,775 | A * | 12/1996 | Kuckes | E21B 47/0228 175/45 |
| 5,675,488 | A | 10/1997 | McElhinney | |
| 5,699,246 | A | 12/1997 | Plasek et al. | |
| 6,937,023 | B2 * | 8/2005 | McElhinney | G01V 3/26 324/346 |
| 7,565,244 | B2 * | 7/2009 | Alumbaugh | G01V 3/30 702/6 |
| 7,568,532 | B2 * | 8/2009 | Kuckes | E21B 47/024 175/45 |
| 7,617,049 | B2 * | 11/2009 | McElhinney | E21B 47/022 702/14 |
| 7,656,161 | B2 * | 2/2010 | McElhinney | E21B 47/0228 324/346 |
| 7,703,548 | B2 * | 4/2010 | Clark | E21B 47/0228 175/45 |
| 7,816,922 | B2 * | 10/2010 | McElhinney | E21B 47/0228 324/346 |
| 7,816,923 | B2 * | 10/2010 | McElhinney | E21B 47/0228 175/45 |
| 7,991,553 | B2 * | 8/2011 | Alumbaugh | G01V 3/30 702/6 |
| 8,010,290 | B2 | 8/2011 | Illfelder | |
| 8,011,451 | B2 * | 9/2011 | MacDonald | H01J 37/32926 175/45 |
| 8,026,722 | B2 * | 9/2011 | McElhinney | E21B 47/022 324/346 |
| 8,063,641 | B2 * | 11/2011 | Clark | E21B 47/0228 324/345 |
| 8,278,928 | B2 * | 10/2012 | Bespalov | E21B 47/022 324/326 |
| 8,462,012 | B2 * | 6/2013 | Clark | E21B 47/0228 340/853.2 |
| 8,561,720 | B2 | 10/2013 | Edbury et al. | |
| 8,596,382 | B2 | 12/2013 | Clark et al. | |
| 8,827,005 | B2 * | 9/2014 | Morley | E21B 47/092 175/45 |
| 8,912,915 | B2 * | 12/2014 | Hay | E21B 47/09 340/853.1 |
| 8,939,233 | B2 | 1/2015 | Edbury et al. | |
| 9,187,993 | B2 | 11/2015 | Schmidt et al. | |
| 9,273,517 | B2 | 3/2016 | Tchakarov et al. | |
| 9,291,739 | B2 * | 3/2016 | Clark | E21B 47/0228 |
| 9,422,803 | B2 * | 8/2016 | Hanak | E21B 47/0228 |
| 9,810,805 | B2 * | 11/2017 | Bittar | G01V 3/26 |
| 10,145,234 | B2 * | 12/2018 | Bittar | E21B 47/04 |
| 10,301,926 | B2 * | 5/2019 | Bittar | E21B 43/24 |
| 10,309,214 | B2 * | 6/2019 | Eiskamp | E21B 47/022 |
| 10,329,896 | B2 * | 6/2019 | Bang | G01V 3/18 |
| 10,460,429 | B1 * | 10/2019 | Pinkus | G06T 5/20 |
| 10,760,406 | B2 * | 9/2020 | Donderici | E21B 47/13 |
| 10,787,898 | B2 * | 9/2020 | Chang | G01V 3/38 |
| 10,858,929 | B2 * | 12/2020 | Estes | E21B 47/024 |
| 11,092,713 | B2 * | 8/2021 | Wu | G01V 3/18 |
| 2004/0140811 | A1 * | 7/2004 | Conti | G01V 3/28 324/338 |
| 2004/0239329 | A1 * | 12/2004 | Haber | G01V 3/26 324/339 |
| 2005/0168225 | A1 | 8/2005 | Haber et al. | |
| 2006/0131013 | A1 * | 6/2006 | McElhinney | E21B 47/0228 166/66.5 |
| 2007/0176842 | A1 * | 8/2007 | Brune | G01V 3/08 343/866 |
| 2007/0278008 | A1 * | 12/2007 | Kuckes | E21B 47/0228 175/40 |
| 2009/0005992 | A1 * | 1/2009 | Alumbaugh | G01V 3/30 702/7 |
| 2009/0120691 | A1 * | 5/2009 | Waters | E21B 47/0228 175/45 |
| 2009/0157316 | A1 * | 6/2009 | Alumbaugh | G01V 3/30 702/7 |
| 2009/0260878 | A1 * | 10/2009 | Morley | E21B 43/305 175/45 |
| 2009/0308657 | A1 * | 12/2009 | Clark | E21B 47/0228 175/45 |
| 2010/0044035 | A1 * | 2/2010 | Bespalov | E21B 47/022 166/255.1 |
| 2010/0044108 | A1 * | 2/2010 | Bespalov | E21B 47/022 175/24 |
| 2010/0241410 | A1 * | 9/2010 | McElhinney | E21B 47/022 702/6 |
| 2011/0088890 | A1 * | 4/2011 | Clark | E21B 47/022 175/45 |
| 2011/0309836 | A1 * | 12/2011 | Bittar | G01V 3/26 324/339 |
| 2013/0057287 | A1 * | 3/2013 | Le | E21B 47/092 324/346 |
| 2014/0121971 | A1 * | 5/2014 | Hanak | E21B 47/0228 702/6 |
| 2014/0191879 | A1 * | 7/2014 | Bittar | E21B 47/04 340/854.1 |
| 2014/0254317 | A1 * | 9/2014 | Thompson | G01V 1/36 367/21 |
| 2014/0374159 | A1 * | 12/2014 | McElhinney | E21B 43/305 175/45 |
| 2015/0091577 | A1 * | 4/2015 | Donderici | E21B 47/0228 324/326 |
| 2015/0346381 | A1 * | 12/2015 | Donderici | E21B 47/022 702/6 |
| 2015/0378043 | A1 * | 12/2015 | Brooks | E21B 7/06 702/9 |
| 2016/0041293 | A1 * | 2/2016 | Boudah | G01V 3/26 702/7 |
| 2016/0041294 | A1 * | 2/2016 | Wu | E21B 47/0228 324/338 |
| 2016/0041296 | A1 * | 2/2016 | Ahmad | G01V 3/38 324/346 |
| 2017/0097441 | A1 * | 4/2017 | Eiskamp | G01V 3/26 |
| 2017/0138173 | A1 * | 5/2017 | Estes | E21B 7/04 |
| 2018/0291723 | A1 * | 10/2018 | Chang | E21B 7/04 |
| 2018/0355712 | A1 * | 12/2018 | Nguyen | G01V 1/40 |
| 2019/0078433 | A1 * | 3/2019 | Bittar | E21B 47/04 |
| 2019/0271788 | A1 * | 9/2019 | Guigne | E21B 49/00 |
| 2020/0292728 | A1 * | 9/2020 | Ang | E21B 47/10 |
| 2021/0173114 | A1 * | 6/2021 | Wilson | G01V 3/18 |
| 2021/0246777 | A1 * | 8/2021 | Zhao | E21B 33/14 |

FOREIGN PATENT DOCUMENTS

| | | | | |
|---|---|---|---|---|
| WO | WO-2013071223 | A2 * | 5/2013 | ........... E21B 17/028 |
| WO | WO 2015/099673 | A1 | 7/2015 | |
| WO | WO-2015099673 | A1 * | 7/2015 | ............. E21B 47/00 |
| WO | WO-2017087483 | A1 * | 5/2017 | ......... E21B 43/2406 |

OTHER PUBLICATIONS

Menke, "Geophysical Data Analysis: Discrete Inverse Theory", vol. 45, 1$^{st}$ Edition, Elsevier, Amsterdam.

S. H. Ward, and G. W. Hohmann, 1988, Electromagnetic theory for geophysical applications, in M. Nabighian (Ed.), Electromagnetic Methods in Applied Geophysics: vol. 1, Theory: Society of Exploration Geophysicists, Tulsa, 131-311.

\* cited by examiner

DOWNHOLE RANGING USING SPATIALLY CONTINUOUS CONSTRAINTS

PRIORITY

The present application is a U.S. National Stage patent application of International Patent Application No. PCT/US2017/036538, filed on Jun. 8, 2017, the benefit of which is claimed and the disclosure of which is incorporated herein by reference in its entirety.

FIELD OF THE DISCLOSURE

The present disclosure relates generally to downhole ranging and, more specifically, to improved downhole ranging techniques using spatially continuous constraints.

BACKGROUND

As the easy-to-access and easy-to-produce hydrocarbon resources have been depleted over the last century, more and more difficult wells remain. As the world's hydrocarbon demand is continuously growing, meeting this demand requires development of more advanced recovery procedures, one of which is the Steam Assisted Gravity Drainage ("SAGD") application. SAGD addresses the mobility problem of heavy oil wells by injecting high pressure and temperature steam to reduce viscosity of the oil, thereby allowing easier extraction. The injection is performed from a wellbore (i.e., injector) that is drilled in parallel to the producing well (i.e., producer) at a distance in the order of a few meters from each other. The placement of the injector well needs to be achieved within a very small margin of error in distance, since drilling the wells tool closely exposes the producing well to very high pressures/temperatures, and drilling the wells too far apart reduces efficiency of the process. A variety of ranging techniques exist to drill such well configurations.

One major drawback to existing ranging techniques is measurement contamination. The ranging measurements may be contaminated by systematic and/or random errors which can vary with measured depth. As such, direct calculation of a range may result in unrealistic range estimates. In ranging, magnetic field and gradient data is measured and a corresponding range and direction calculated on a point-by-point basis. These ranges and directions, together with logging-while-drilling ("LWD") navigation data, are then stitched together to form a spatial model of the target well and bottom hole assembly trajectory. In practice, however, the model may contain various anomalies, thereby rending the ranging calculations inaccurate.

DESCRIPTION OF ILLUSTRATIVE EMBODIMENTS

Illustrative embodiments and related methods of the present disclosure are described below as they might be employed in ranging systems employing spatially continuous filtering techniques to determine the range between a first and second wellbore. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

As described herein, illustrative embodiments and methods of the present disclosure describe ranging systems that use spatially continuous filtering techniques to constrain ranging measurements, thereby improving ranging calculations (i.e., distance and/or direction) between a bottom-hole-assembly ("BHA") and at least one target well. In a general embodiment of the present disclosure, ranging measurements are acquired as magnetic fields and/or gradients at multiple points ("measured depths") along a well path. This data is inverted for distance and direction from the BHA to the target well. Since the BHA trajectory and the target well path are spatially continuous, the distance and direction are also spatially continuous. Thus, a variety of spatially continuous filtering techniques are described herein that functionally represent the distance and direction to enforce such spatial continuity. As used herein, the term "spatially continuous filtering technique" refers to methods of preserving continuity in both distance and direction from the BHA to the target well. By taking advantage of the spatial continuity of the wellbore geometry, the methods described herein provide improved distance and direction estimates, as well as prediction of distance and direction of the target well ahead of the BHA (e.g., to mitigate end-of-pipe effects where current leak off results in low signal-to-noise ratio)

In a generalized method of the present disclosure, a plurality of first ranging measurement signals are acquired along a variety of depths. Thereafter, in real-time, a spatially continuous filtering technique is applied to the first ranging measurement signals to calculate a model second ranging measurement signal at a second deeper wellbore depth. The range between a first and second wellbore is then determined using the model second ranging measurement signal in a variety of ways, as described herein. For example, in certain methods, the model second ranging measurement signal is used as the acquired second ranging measurement signal, thereby predicting the range ahead of the BHA. In other methods, a second ranging measurement signal is acquired and compared to the model second ranging measurement signal to thereby determine the accuracy of the second ranging measurement signal. If found to be accurate, the second ranging measurement signal is used to perform ranging. If found to be inaccurate, the second ranging measurement signal may be replaced with the model second ranging measurement signal or another ranging measurement signal may be acquired. These and other advantages of the present disclosure will be readily apparent to those ordinarily skilled in the art having the benefit of this disclosure.

Although the present disclosure may be utilized in a variety of applications, the following description will focus on applications for accurately and reliably positioning a well being drilled (e.g., injector or monitoring well) with respect to a nearby target first well, usually the producer well, so that the injector well can be maintained approximately parallel to the producer well. The target well must be of a higher conductivity than the surrounding formation, which may be realized through the use of an elongated conductive body along the target well, such as, for example, casing which is already present in most wells to preserve the integrity of the well and act as a conduit for flow of produced fluids. Also, the method and system of the disclosure are particularly desirable for the drilling of SAGD wells because the two wells can be drilled close to one another as is required in SAGD operations. These and other applications and/or adaptations will be understood by those ordinarily skilled in the art having the benefit of this disclosure.

Figure 1:
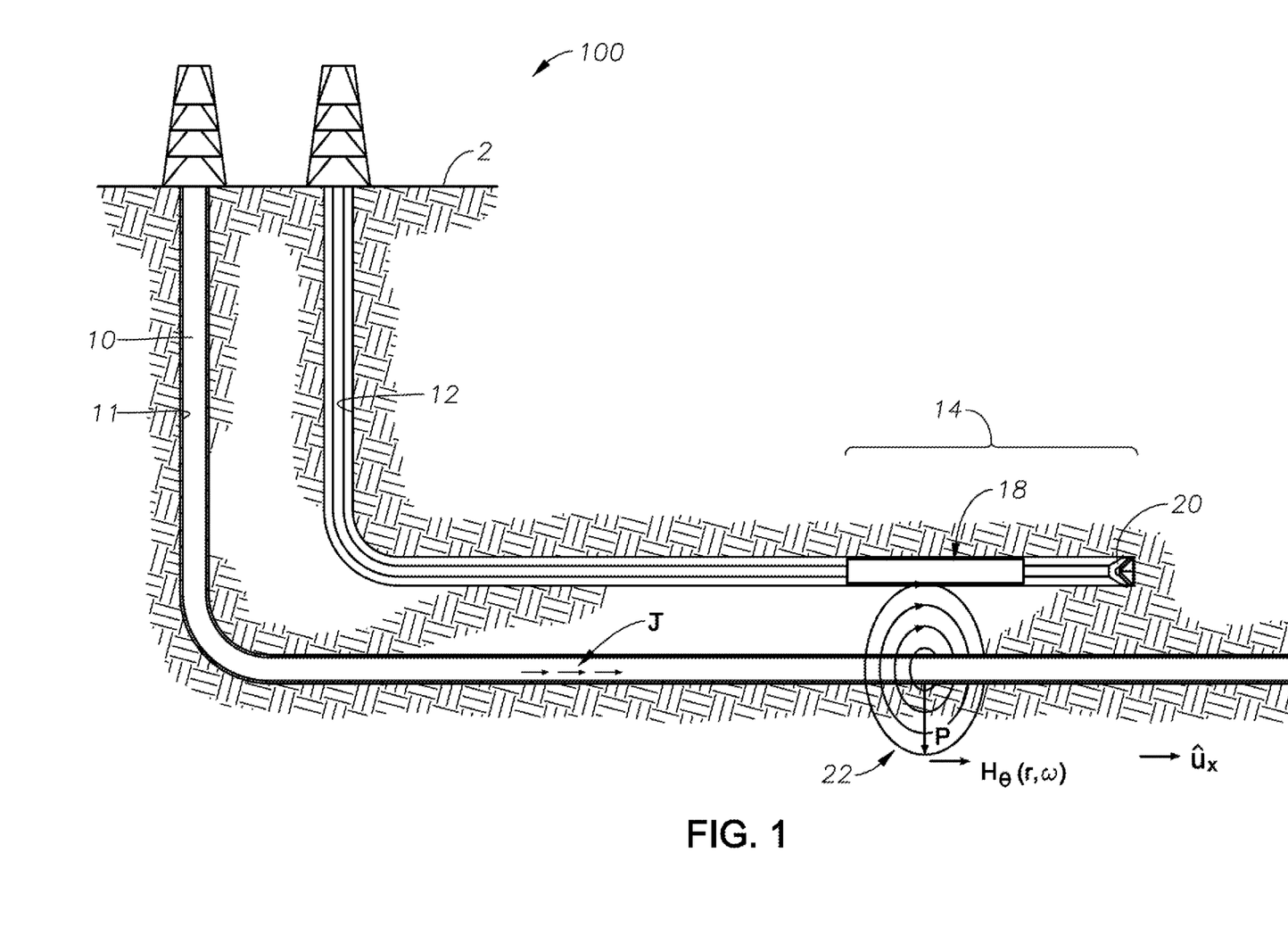
FIG. 1 illustrates a ranging system, according to an illustrative embodiment of the present disclosure.

FIG. 1 illustrates a ranging system 100 according to an illustrative embodiment of the present disclosure. In this embodiment, a target or producer well 10 is drilled using any suitable drilling technique. Thereafter, producer well 10 is cased with casing 11. An injector well 12 is then drilled using BHA 14 which may be, for example, a LWD assembly, measurement-while drilling assembly ("MWD"), or other desired drilling assembly having a drill bit 20. Although injector well 12 is described as being subsequently drilled, in other embodiments producer well 10 and injector well 12 may be drilled in turns. For example, vertical and build sections of the producer well may be drilled first, vertical and build sections of the injector well may be drilled next, the horizontal section of the producer well may be drilled next and the horizontal section of the injector well then be drilled. Moreover, in yet another alternate embodiment, BHA 14 may be embodied as a wireline application (without a drilling assembly) performing logging operations, as will be understood by those ordinarily skilled in the art having the benefit of this disclosure.

In order to perform ranging operations in certain illustrative embodiments, current J must be flowing along casing 11. Current J flowing along producer well 10 may be excited in a variety of ways. In certain illustrative embodiments, for example, a wireline system is deployed down producer well 10 to generate current J along casing 11 which then induces electromagnetic ("EM") fields 22 emanating out toward injector well 12. In certain other embodiments, for example, producer well 10 may be excited by current sources on the wellhead of producer well 10, surface 2, or within injector well 12.

In this illustrative embodiment, the BHA/drilling assembly 14 includes one or more electromagnetic sensors 18 that sense absolute and/or gradient electromagnetic fields 22 to thereby decouple and produce ranging measurement signals. In this embodiment, sensors/receivers 18 are located along BHA 14 and measure all three components of the electric or magnetic fields, which could be x, y and z in the tool coordinates (i.e., triaxial). Even though use of absolute signals is sufficient for the illustrative embodiments herein, more information can be obtained by measuring phase, real or imaginary components, or gradiometric information in alternate embodiments. Here, gradiometric information may be associated with the measurements in complex domain, phase or amplitude. Due to specific operational bands of the excitation source, sensors 18 must be sensitive at this range. Thus, in certain illustrative embodiments, sensors 18 may be, for example, an electrode pair, electric dipole (wire antenna, toroidal winding), magnetic dipole (coil, solenoid antenna), electric loop or magnetometer. The magnetometers/sensors can be of flux-gate or atomic type.

Furthermore, although not shown, BHA 14 includes processing circuitry necessary (i.e., system control center) to achieve the spatially continuous ranging techniques described herein in real-time. Such circuitry includes a communications unit to facilitate interaction between the drilling system and a remote location (such as the surface). A visualization unit may also be connected to communications unit to monitor the ranging measurement data being process; for example, an operator may intervene the system operations based on this data. A data processing unit may convert the received data into information giving the target's position, direction and orientation in real-time. Thereafter, results may be displayed via the visualizing unit.

The system control center of BHA 14 also includes the storage/communication circuitry necessary to perform the calculations described herein. In certain embodiments, that circuitry is communicably coupled to sensors 18 in order to process the received EM fields 22. Additionally, the circuitry on-board BHA 14 may be communicably coupled via wired or wireless connections to the surface to thereby communicate data back uphole and/or to other assembly components (to steer a drill bit 20 forming part of assembly 14, for example). In an alternate embodiment, the system control center or other circuitry necessary to perform one or more aspects of the techniques described herein may be located at a remote location away from BHA 14, such as the surface or in a different wellbore. In other embodiments, the electromagnetic field measurements may be communicated remotely to the system control center for processing. These and other variations will be readily apparent to those ordinarily skilled in the art having the benefit of this disclosure.

Moreover, the on-board circuitry includes at least one processor and a non-transitory and computer-readable storage, all interconnected via a system bus. Software instructions executable by the system control center for implementing the illustrative relative positioning methods described herein in may be stored in local storage or some other computer-readable medium. It will also be recognized that the ranging software instructions may also be loaded into the storage from a CD-ROM or other appropriate storage media via wired or wireless methods.

Moreover, those ordinarily skilled in the art will appreciate that various aspects of the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

During operation of the system illustrated in FIG. 1, sensor(s) 18 along BHA 14 sense EM waves 20 emanating from target well 10 at various depths, which are processed by the sensor circuitry as first ranging measurement signals. Once two or more first ranging measurement signals have been acquired along the well path, a spatially continuous filtering technique is applied by the ranging system to calculate a model second ranging measurement signal at a second deeper depth. Simultaneously, real second ranging measurement signals are continuously acquired by the ranging system and compared to the model second ranging measurement signal for accuracy. Dependent upon the outcome of the accuracy determination, the second ranging measurement signals may be: used to perform ranging between the injector and target wellbore; disposed of and then other second ranging measurement signals are acquired; or replaced with the model second ranging measurement signals. In an alternate method, the model second ranging measurement signal may be used as the second ranging measurement signal (without any accuracy determination), thus enabling prediction of the range ahead of the BHA.

Now that the present disclosure has been summarized, a discussion of the underlying theory will now be provided. With reference to FIG. 1, the target well is defined by the coordinate system r={x,y,z} and can be approximated by an infinitely long current source oriented in the z direction in a homogeneous geological formation of conductivity τ, such that the electric current along the target well casing can be approximated as:

$$J(r)=I\delta(r)\delta(x)\hat{u}_x \qquad \text{Eq.(1)},$$

where I is the current in amperes, δ is a spatial delta function, and $\hat{u}_x$ is a unit vector in the x-direction.

Given the radial symmetry about the target well, the EM fields can be described in cylindrical coordinates r=(x,ρ,θ) about the x axis. Note that the cylindrical coordinates r=(x,ρ,θ) can be transformed to Cartesian coordinates r=(x,y,z), and vice versa. Of particular interest to EM ranging is the distance to the target well:

$$\rho = \sqrt{(y^2+z^2)}, \qquad \text{Eq.(2)},$$

and the direction (angle) to the target well, θ. The magnetic field about the target well only has a θ-directed tangential component:

$$H_\theta(r,\omega)=(ikI/2\pi)K_1(ik\rho)\hat{u}_\theta \qquad \text{Eq.(3)},$$

where $K_1$ is the modified Bessel function of the second kind of order one, i is the imaginary number √−1, ω is angular frequency, and k is the electromagnetic wave number. At low frequencies used for and small distances typically encountered in ranging, the modified Bessel functions in Equation (3) can be approximated by:

$$K_1(ik\rho) \approx (-1/ik\rho) \qquad \text{Eq.(4)},$$

such that the magnetic (Eq. 3) fields are approximated as:

$$H_\theta(r,\omega)=(-I/2\pi\rho)\hat{u}_\theta \qquad \text{Eq.(5)}$$

It follows that the gradient of the magnetic field may be approximated as:

$$\frac{\partial H_\theta(r,\omega)}{\partial \rho} = \frac{I}{2\pi\rho^2}\hat{u}_\theta, \qquad \text{Eq.(6)}$$

where ∂ is the partial derivative of the magnetic field, used to indicate the gradient measurement. In certain illustrative methods, to determine the distance and eliminate the unknown current, we take the ratio of the magnetic field and gradient:

$$\rho = -H_\theta(r,\omega)\times\left(\frac{\partial H_\theta(r,\omega)}{\partial \rho}\right)^{-1}. \qquad \text{Eq.(7)}$$

The direction likewise may be calculated using a variety of techniques, such as, for example, the use of the total field and/or gradient field. Those ordinarily skilled in the art having the benefit of this disclosure will realize any variety of methods to acquire ranging measurements (distance and direction) may be utilized with the present disclosure.

In view of the foregoing, it is appreciated that the magnetic field and gradient ranging measurements may be contaminated by systematic and/or random errors, and those errors may vary with measured depth. As such, direct calculation of a distance per Equation (7) may result in unrealistic range estimates. In ranging, magnetic field and gradient data are typically measured, and a corresponding distance and direction calculated, on a point-by-point (or depth-by-depth) basis. These distances and directions, together with LWD navigation data, are then stitched together to form a spatial model of the target well and BHA trajectory.

Figure 2A:
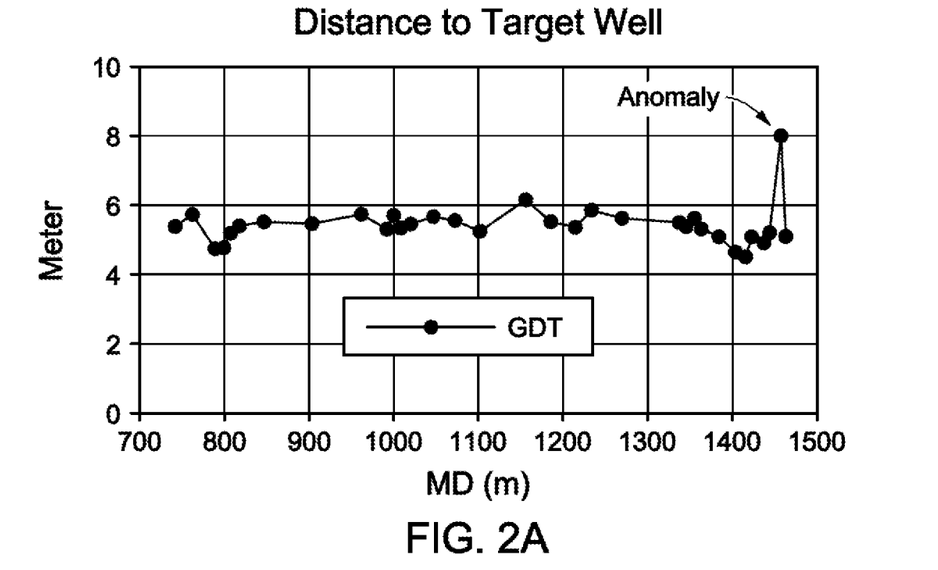
FIGS. 2A and 2B are plots of the distance and direction data, respectively, to the target well using Equation 7 described herein.
Figure 2B:
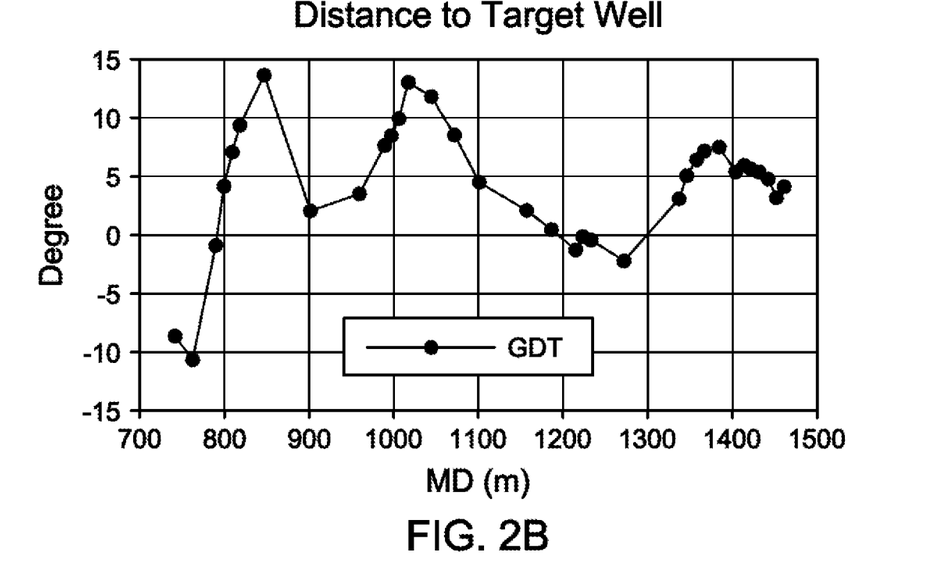

In practice, however, the spatial data contains unrealistic artifacts. For example, FIGS. 2A and 2B are plots of the distance and direction data (i.e., ranging measurement signals), respectively, to the target well using Equation 7. The ranging measurement signals were acquired using a magnetic gradient ranging tool. As can be seen in FIG. 2A, there is an anomalous result circa 1450 m measured depth ("MD"). This anomaly is not surprising, however, as the SNR decreases with depth because the current on the target well decays with depth. This anomaly is unrealistic, as the distance to the target well must be a continuous function of distance because, physically, the nature of steel casing and drill string does not allow for such abrupt changes in geometry.

Accordingly, the illustrative methods of the present disclosure exploit the fact that both the casing of the target well and the BHA well path are spatially continuous; because the casing of the target well and the drill string are also spatially continuous. Therefore, it is physically unrealistic to have a discontinuous distance or direction. The target and injector well may, however, have sudden distance and direction variation from one depth to another depth for other ranging applications, such as well interception. However, this can be also resolved by collaborating the target well survey to understand the continuity of the target well casing.

In this disclosure, the illustrative ranging models may be functionally described by two spatially continuous functions, jointly referred to as spatially continuous filtering techniques: one function for the distance and one function for the direction. Essentially, the functions are output estimation functions based on the input data set (distance and/or direction ranging measurements) and the filtering technique utilized. The use of spatially continuous functions to describe the ranging model exploits the spatial coherency of ranging-while-drilling ("RWD") data, and the spatial continuity of the ranging models.

In certain illustrative methods of the present disclosure, the ranging model parameters can be described using splines to ensure continuity, smoothness, and local support of the ranging model parameters. The choice of splines may include, but not limited to, linear, bilinear, cubic, or B-splines. A spline representation has the advantage of minimizing the number of spline nodes required to describe the ranging model parameters. The spline node spacing is dependent on the minimum of the expected length scale of variations within the target well path, and the RWD system's sensitivity. In additional, the survey data of the target well can be included in the spline coefficients determination to understand the continuity of the casing profiles along the target well.

Figure 3:
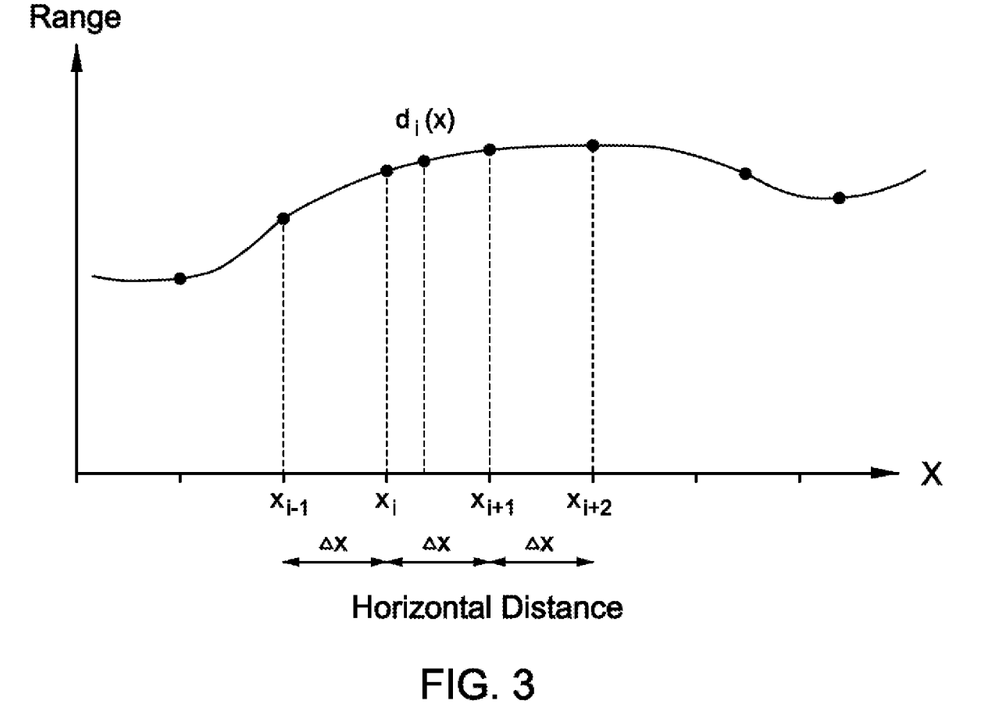
FIG. 3 is an earth model showing a B-spline representation of distance (assuming direction is exactly zero)

For example, consider the 2D earth model in FIG. 3 which shows a B-spline representation of distance (assuming direction is exactly zero). The distance between the BHA and target well can be defined by one B-spline of $N_m$ knots (the equidistant points in FIG. 3). The value of the B-spline at any point $d_i(x)$ is evaluated through the weighted sum of the four adjacent spline node coefficients:

$$d_i(x) = \Sigma_{p=i-1}^{i+2} a_p(x) m_p,  \quad \text{Eq.(8)}$$

where $m_p$ are the unknown spline coefficients, and $a_p(x)$ are the known spline coefficients:

$$a_p(x) = b_p\left(\frac{x - x_i}{\Delta x}\right), \quad \text{Eq.(9)}$$

where $b_p(t)$ are the basis functions:

$$b_{-1}(t) = \frac{1}{6}(1\ 3t\ |\ 3t^2\ t^3), \quad \text{Eq.(10)}$$

$$b_0(t) = \frac{1}{6}(4\ 6t^2\ |\ 3t^3), \quad \text{Eq.(11)}$$

$$b_1(t) = \frac{1}{6}(1\ |\ 3t\ |\ 3t^2\ 3t^3), \text{ and} \quad \text{Eq.(12)}$$

$$b_2(t) = \frac{1}{6}t^3, \quad \text{Eq.(13)}$$

where t is a spatial variable in the basis function. This implies the range is locally supported, because the range at any location is dependent only upon four adjacent spline node coefficients. The unknown spline coefficients form an $N_m$ length vector of model parameters m, such that:

$$d = Am \quad \text{Eq.(14),}$$

where d is an $N_d$ length vector of distances, and A is an $N_d \times N_m$ matrix of known spline coefficients. Since each datum (distance) is influenced only by the four adjacent nodes of the spline, the majority of entries in A are zero. Model and data weights can be introduced via model and data weighting matrices $W_m$ and $W_d$, respectively:

$$\tilde{d} = W_d d = W_d A W_m^{-1} W_m m = \tilde{A}\tilde{m} \quad \text{Eq.(15),}$$

where $\tilde{d}$ and $\tilde{m}$ are the re-weighted data and model parameters. For example, spline coefficients behind the BHA may be weighted less such that they do not deviate from previously processed values. The unknown spline coefficients are solved from:

$$\tilde{m} = (\tilde{A}^T \tilde{A})^{-1} \tilde{A}^T \tilde{d}, \quad \text{Eq.(16),}$$

and may be stabilized via a regularization:

$$\tilde{m} = (\tilde{A}^T \tilde{A} + \alpha I)^{-1} \tilde{A}^T \tilde{d} \quad \text{Eq.(17)}$$

where $\alpha$ is a scalar introduced to ensure that $(\tilde{A}^T \tilde{A} + \alpha I)^{-1}$ is always invertible. A variety of regularized inversion techniques may be used, as well as appraisal of errors/uncertainties in the model parameters.

In the illustrative methods described above, the spline coefficients are a function only of position at which the range is being evaluated, and therefore remain constant during the inversion. Hence, the primary purpose of the inversion is to recover the spline coefficients $c_p$. Once the spline coefficients are determined, they are integrated into Equation (8), whereby the points $d_i(x)$ are calculated to solve for the model second ranging measurement signals.

In certain alternative methods, the above method may also be developed for direction, and a combination of distance and direction. This is done by parameterizing direction, and both distance and direction, as splines, as per the above example.

Note there is no requirement that the spline node spacing should be equidistant. In real-time applications, the node spacing may be dynamically modified (e.g., increased or decreased).

Note that in FIG. 3, the spline coefficients in front of the LWD tool position can be extrapolated from spline coefficients nearby and behind the LWD tool position; thus enabling prediction of the range ahead of the RWD tool. This is important for ranging impacted by end-of-pipe effects and/or estimating collision and/or avoidance. To achieve this "look ahead" capability, spline extrapolation is performed beyond the determined spline coefficients.

The methods described herein provide a number of advantages. For example, note that, in certain illustrative methods, choice of the node spacing implicitly introduces a sliding window on the inversion via Equations (1) and (5); but without need to account for the sliding window in terms of algorithm/software bookkeeping. This reduces algorithm complexity. Also, note that lateral smoothness of the earth model is implicitly enforced by the B-spline, without the need to explicitly introduce lateral constraints or penalty terms into the regularization; especially in terms of algorithm/software bookkeeping. This further reduces algorithm complexity.

However, this disclosure is not limited to the use of splines, as any variety of continuous spatial interpolation functions (e.g., Lagrange polynomials, B-spline, etc.) may be used. For example, in certain embodiments, the spatially continuous filtering technique applies a Kalman filter in the ranging distance and direction measurements. In such methods, the Kalman filter is applied directly to the good ranging measurements prior to a depth with bad shot (i.e., bad ranging measurement) and applied to a future depth to estimate the ranging measurements at that depth (i.e., to estimate the model second ranging measurement signal based on the first ranging measurement signals).

In all illustrative embodiments described herein, a priori information may be imposed on the ranging model as a choice of data weights, model weights, regularization, model constraints and/or a priori models of the target well path and the BHA well path (e.g., from survey or navigation data).

Figure 4:
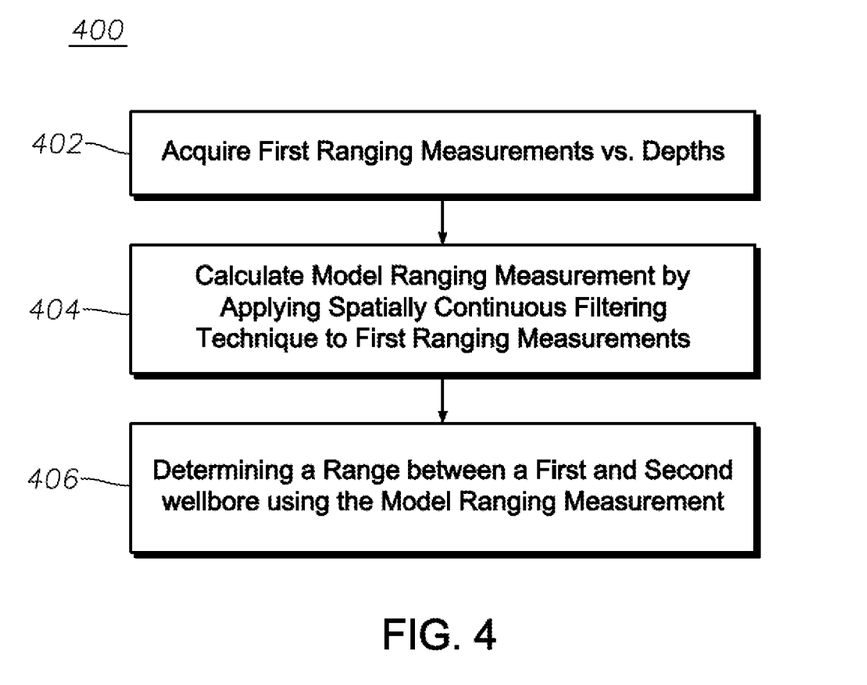
FIGS. 4 and 5 are methods for performing ranging operations, according to alternative methods of the present disclosure.

FIG. 4 is a flow chart of a method 400 for downhole ranging, according to certain illustrative methods of the present disclosure. In this example, a SAGD operation is being conducted. With reference to FIGS. 1 and 4, BHA assembly 14 is a ranging tool that senses EM waves 22 at various depths along target wellbore 10 and thereby generates corresponding measurement signals. Thus, at block 402, first ranging measurement signals are acquired by the ranging tool deployed along injector wellbore 12. Once acquired, processing circuitry applies one of the spatially continuous filtering techniques described herein to the first ranging measurement signals to calculate a model second ranging measurement signal at a second depth different from the first depths at which the first ranging measurement signals were acquired. The model second ranging measurement signal is a simulated signal (to be distinguished from a real acquired measurement signal). At block 406, the model second ranging measurement signal is applied to determine the range between the injector and target wells, in a variety of ways as described herein.

Figure 5:
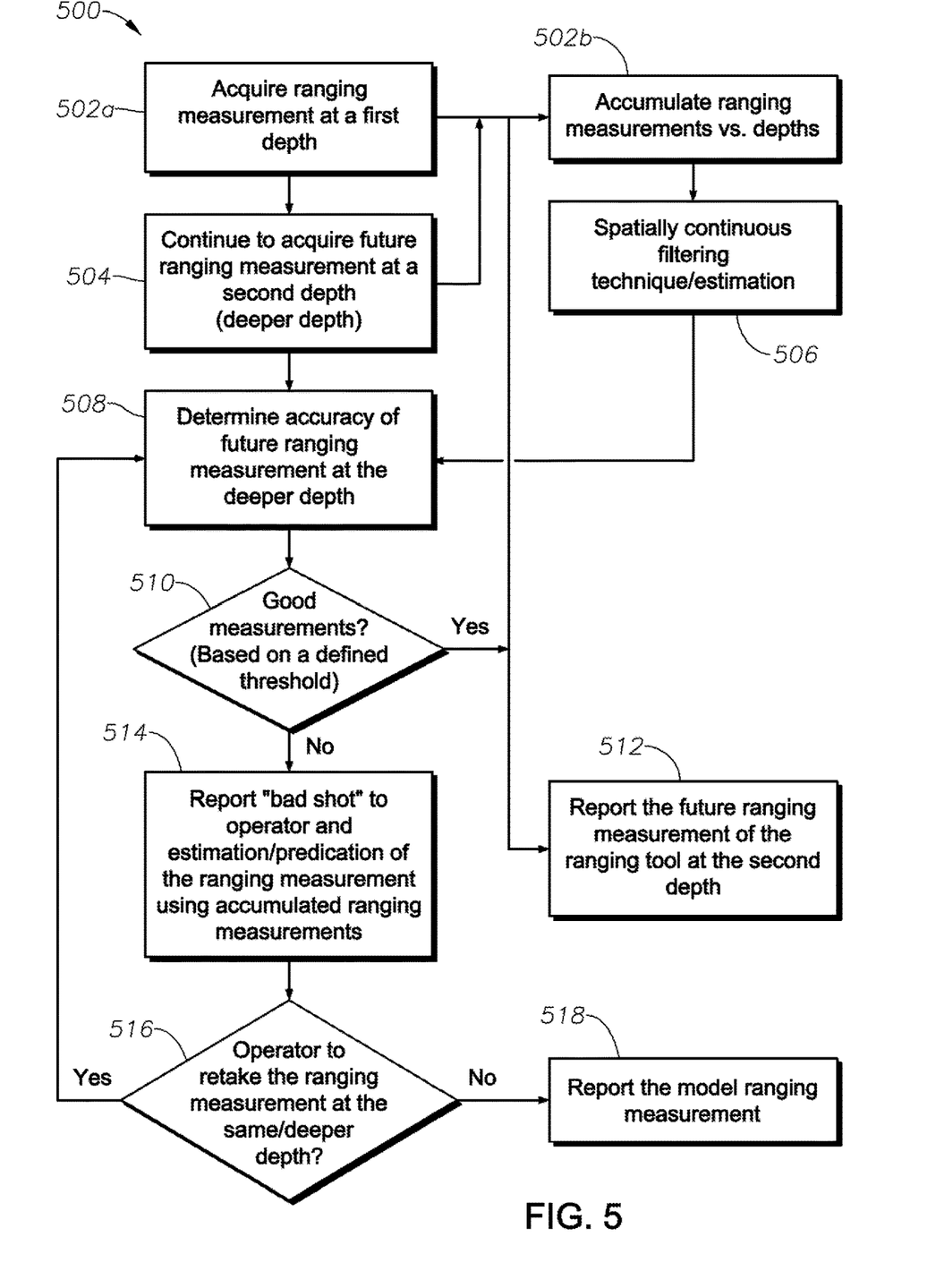

FIG. 5 is a flow chart of a more detailed method 500 for downhole ranging, according to certain illustrative methods of the present disclosure. In this example, a SAGD operation is being conducted once more. At block 502a, BHA assembly 14 acquires a first ranging measurement signal at a first depth. At block 502b, BHA assembly 14 continues acquiring additional ranging measurements at various other depths along the wellbore. In this example, all the ranging measurement signals acquired at blocks 502a and 502b may be referred to as "first ranging measurement signals" at various "first depths."

At block 504, BHA 14 continues to acquire future (or second) ranging measurement signals at second depths (deeper than those of the first ranging measurement signals). In one option, these second ranging measurement signals may be accumulated at block 502b as first ranging measurement signals. Alternatively, however, the accuracy of the second ranging measurement signals may be evaluated as described herein. To do so, at block 506, the spatially continuous filtering techniques described herein at applied to calculate a model second ranging measurement signal. The model second ranging measurement signal is a simulation of an accurate representation of what a future acquired second measurement signal should be. In other words, the prior (first) ranging measurement signals are used to calculate the modeled second ranging measurement signal, thereby constraining the determination of future ranging measurement signals.

Thus, at block 508, the accuracy of the future (second) ranging measurement signal of block 504 is determined by comparing the future (second) ranging measurement signal of block 504 to the model second ranging measurement signal of block 506. In certain illustrative methods, the comparison involves calculating an error between the observed and model ranging measurements.

At block 510, the system then determines whether the future (second) ranging measurement signal is an acceptable measurement. In certain illustrative methods, this determination is made by analyzing whether the error between the observed and predicted ranging measurements is less than a pre-determined threshold, or error tolerance (e.g., +/−5%). If the answer is "yes," i.e., found to be accurate, the future (second) ranging measurement signal is reported to the system or operator at block 512, or used as another iterative input into block 502b. If the answer is "no," i.e., found to be inaccurate at block 514, it is reported as a "bad shot" to the operator or system, whereby the operator or system can reacquire another future (second) ranging measurement signal at the same depth or a deeper depth at block 516. If the operator or system opts not to retake the future (second) ranging measurement signal, the model second ranging measurement signal may be adopted as the future (second) ranging measurement signal. If, however, the operator or system opts to reacquire the future (second) ranging measurement signal, the method loops back to block 508 and repeats. Ultimately, the second (future) ranging measurement signals are used to steer the BHA. Note, the phrase "operator or system" or the like, refers to embodiments whereby the operator can control the system in real-time or the ranging system itself is automated to make real-time ranging determinations apart from an operator, or a combination of the two.

The illustrative modeling and inversion methods described in this disclosure can be implemented as either a stand-alone software or integrated as part of a commercial survey/navigation/collision avoidance software or digital asset modeling software through an application programmable interface ("API"). The spatially continuous filtering methods are performed in real-time as the BHA is drilling the injector well. Moreover, the disclosed processing may be performed remotely from the well site, whereby computers at the well site are connected to the remote processing computers via a network.

The illustrative embodiments and methods described herein exploit the spatial continuity of the BHA trajectory and target well path, to form a spatially continuous ranging model (distance and direction). The functional ranging model parameterization significantly decreases the number of model parameters required to completely define a ranging model, while simultaneously enforcing spatial continuity. One advantage of the described methods is their improved (as compared to conventional approaches) estimation of systematic and random noise in the data, which cannot be reproduced with a spatially continuous model (i.e., by not over-fitting noisy data to produce discontinuous ranging models).

Methods and embodiments described herein further relate to any one or more of the following paragraphs:

1. A method for downhole ranging, comprising acquiring a plurality of first ranging measurement signals of a first wellbore at a plurality of first depths; applying a spatially continuous filtering technique to the first ranging measurement signals to calculate a model second ranging measurement signal at a second depth different from the first depths; and determining a range of the first wellbore relative to a second wellbore using the model second ranging measurement signal.

2. The method as defined in paragraph 1, wherein the model second ranging measurement signal is calculated in real-time.

3. The method as defined in paragraphs 1 or 2, wherein the first ranging measurement signals are acquired using a sensor deployed on a bottom hole assembly positioned in the second wellbore; and the model second ranging measurement signal is used as an acquired second ranging measurement signal, thereby predicting the range of the first wellbore relative to the second wellbore ahead of the bottom hole assembly.

4. The method as defined in any of paragraphs 1-3, wherein a second ranging measurement signal is acquired at the second depth; applying the spatially continuous filtering technique further comprises comparing the second ranging measurement signal to the model second ranging measurement signal in order to determine the accuracy of the second ranging measurement signal; and the second ranging measurement signal is used to determine the range of the first wellbore relative to the second wellbore.

5. The method as defined in any of paragraphs 1-4, wherein, if the second ranging measurement signal is determined to be inaccurate another second ranging measurement signal is acquired at the second depth; or the model second ranging measurement signal is used as the second ranging measurement signal.

6. The method as defined in any of paragraphs 1-5, wherein the accuracy of the second ranging measurement signal is determined in real-time.

7. The method as defined in any of paragraphs 1-6, wherein applying the spatially continuous filtering technique comprises applying a spatially continuous interpolation function to the first ranging measurement signals.

8. The method as defined in any of paragraphs 1-7, wherein applying the spatially continuous filtering technique comprises applying a Kalman filter to the first ranging measurement signals.

9. The method as defined in any of paragraphs 1-8, wherein the first ranging measurement signals are acquired using a sensor deployed on a bottom hole assembly positioned in the second wellbore.

10. The method as defined in any of paragraphs 1-9, further comprising steering the bottom hole assembly using the second ranging measurement signal.

11. A system for downhole ranging, comprising a bottom hole assembly having one or more sensors positioned thereon to acquire ranging measurement signals; and processing circuitry coupled to the sensors and operable to perform a method comprising: acquiring a plurality of first ranging measurement signals of a first wellbore at a plurality of first depths; applying a spatially continuous filtering technique to the first ranging measurement signals to calculate a model second ranging measurement signal at a second depth different from the first depths; and determining a range of the first wellbore relative to a second wellbore using the model second ranging measurement signal.

12. The system as defined in paragraph 11, wherein the model second ranging measurement signal is calculated in real-time.

13. The system as defined in paragraph 11 or 12, wherein the first ranging measurement signals are acquired using a sensor deployed on a bottom hole assembly positioned in the second wellbore; and the model second ranging measurement signal is used as an acquired second ranging measurement signal, thereby predicting the range of the first wellbore relative to the second wellbore ahead of the bottom hole assembly.

14. The system as defined in any of paragraphs 11-13, wherein a second ranging measurement signal is acquired at the second depth; applying the spatially continuous filtering technique further comprises comparing the second ranging measurement signal to the model second ranging measurement signal in order to determine the accuracy of the second ranging measurement signal; and the second ranging measurement signal is used to determine the range of the first wellbore relative to the second wellbore.

15. The system as defined in any of paragraphs 11-14, wherein, if the second ranging measurement signal is determined to be inaccurate another second ranging measurement signal is acquired at the second depth; or the model second ranging measurement signal is used as the second ranging measurement signal.

16. The system as defined in any of paragraphs 11-15, wherein the accuracy of the second ranging measurement signal is determined in real-time.

17. The system as defined in any of paragraphs 11-16, wherein applying the spatially continuous filtering technique comprises applying a spatially continuous interpolation function to the first ranging measurement signals.

18. The system as defined in any of paragraphs 11-17, wherein applying the spatially continuous filtering technique comprises applying a Kalman filter to the first ranging measurement signals.

19. The system as defined in any of paragraphs 11-18, wherein the first ranging measurement signals are acquired using a sensor deployed on a bottom hole assembly positioned in the second wellbore.

20. The system as defined in any of paragraphs 11-19, further comprising steering the bottom hole assembly using the second ranging measurement signal.

21. A system as defined in any of paragraphs 11-20, wherein the first wellbore is a producer well; and the second wellbore is an injector well.

Moreover, the methods described herein may be embodied within a system comprising processing circuitry to implement any of the methods, or a in a non-transitory computer-readable medium comprising instructions which, when executed by at least one processor, causes the processor to perform any of the methods described herein.

Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A method for downhole ranging, comprising:
  acquiring a plurality of first ranging measurement signals of a first wellbore at a plurality of first depths;
  acquiring a second ranging measurement signal at a second depth different from the first depths;
  applying a spatially continuous filtering technique to the first ranging measurement signals to calculate a model second ranging measurement signal at the second depth different from the first depths;
  comparing the second ranging measurement signal to the model second ranging measurement signal in order to determine the accuracy of the second ranging measurement signal;
  determining a range of the first wellbore relative to a second wellbore using the second ranging measurement signal; and
  steering a bottomhole assembly using the second ranging measurement signal.

2. The method as defined in claim 1, wherein the model second ranging measurement signal is calculated in real-time.

3. The method as defined in claim 1, wherein:
  the first ranging measurement signals are acquired using a sensor deployed on a bottom hole assembly positioned in the second wellbore; and
  the model second ranging measurement signal is used as an acquired second ranging measurement signal, thereby predicting the range of the first wellbore relative to the second wellbore ahead of the bottom hole assembly.

4. The method as defined in claim 1, wherein, if the second ranging measurement signal is determined to be inaccurate:
  another second ranging measurement signal is acquired at the second depth; or
  the model second ranging measurement signal is used as the second ranging measurement signal.

5. The method as defined in claim 1, wherein the accuracy of the second ranging measurement signal is determined in real-time.

6. The method as defined in claim 1, wherein applying the spatially continuous filtering technique comprises applying a spatially continuous interpolation function to the first ranging measurement signals.

7. The method as defined in claim 1, wherein the first ranging measurement signals are acquired using a sensor deployed on the bottom hole assembly positioned in the second wellbore.

8. A system for downhole ranging, comprising:
a bottom hole assembly having one or more sensors positioned thereon to acquire ranging measurement signals; and
processing circuitry coupled to the sensors and operable to perform a method comprising:
acquiring a plurality of first ranging measurement signals of a first wellbore at a plurality of first depths;
acquiring a second ranging measurement signal at a second depth different from the first depths;
applying a spatially continuous filtering technique to the first ranging measurement signals to calculate a model second ranging measurement signal at the second depth different from the first depths;
comparing the second ranging measurement signal to the model second ranging measurement signal in order to determine the accuracy of the second ranging measurement signal;
determining a range of the first wellbore relative to a second wellbore using the second ranging measurement signal; and
steering a bottomhole assembly using the second ranging measurement signal.

9. The system as defined in claim 8, wherein the model second ranging measurement signal is calculated in real-time.

10. The system as defined in claim 8, wherein:
the first ranging measurement signals are acquired using a sensor deployed on a bottom hole assembly positioned in the second wellbore; and
the model second ranging measurement signal is used as an acquired second ranging measurement signal, thereby predicting the range of the first wellbore relative to the second wellbore ahead of the bottom hole assembly.

11. The system as defined in claim 8, wherein, if the second ranging measurement signal is determined to be inaccurate:
another second ranging measurement signal is acquired at the second depth; or
the model second ranging measurement signal is used as the second ranging measurement signal.

12. The system as defined in claim 8, wherein the accuracy of the second ranging measurement signal is determined in real-time.

13. The system as defined in claim 8, wherein applying the spatially continuous filtering technique comprises applying a spatially continuous interpolation function to the first ranging measurement signals.

14. The system as defined in claim 8, wherein the first ranging measurement signals are acquired using a sensor deployed on the bottom hole assembly positioned in the second wellbore.

15. A system as defined in claim 8, wherein:
the first wellbore is a producer well; and
the second wellbore is an injector well.

16. A non-transitory computer-readable medium comprising instructions which, when executed by at least one processor, causes the processor to perform a method comprising:
acquiring a plurality of first ranging measurement signals of a first wellbore at a plurality of first depths;
acquiring a second ranging measurement signal at a second depth different from the first depths;
applying a spatially continuous filtering technique to the first ranging measurement signals to calculate a model second ranging measurement signal at the second depth different from the first depths;
comparing the second ranging measurement signal to the model second ranging measurement signal in order to determine the accuracy of the second ranging measurement signal;
determining a range of the first wellbore relative to a second wellbore using the second ranging measurement signal; and
steering a bottomhole assembly using the second ranging measurement signal.

* * * * *